(12) United States Patent
Seki et al.

(10) Patent No.: US 10,410,149 B2
(45) Date of Patent: Sep. 10, 2019

(54) AGRICULTURAL WORK MANAGEMENT SYSTEM AND AGRICULTURAL CROP HARVESTER

(71) Applicant: Kubota Corporation, Osaka-shi (JP)

(72) Inventors: Mitsuhiro Seki, Sakai (JP); Kazuhiro Takahara, Sakai (JP)

(73) Assignee: Kubota Corporation, Osaka (JP)

( * ) Notice: Subject to any disclaimer, the term of this patent is extended or adjusted under 35 U.S.C. 154(b) by 946 days.

(21) Appl. No.: 14/431,098

(22) PCT Filed: Sep. 9, 2013

(86) PCT No.: PCT/JP2013/074251
§ 371 (c)(1),
(2) Date: Mar. 25, 2015

(87) PCT Pub. No.: WO2014/050524
PCT Pub. Date: Apr. 3, 2014

(65) Prior Publication Data
US 2015/0242799 A1 Aug. 27, 2015

(30) Foreign Application Priority Data

Sep. 26, 2012 (JP) ................................ 2012-213253
Mar. 26, 2013 (JP) ................................ 2013-064837

(51) Int. Cl.
*G06Q 10/06* (2012.01)
*A01B 79/00* (2006.01)
(Continued)

(52) U.S. Cl.
CPC .... *G06Q 10/063114* (2013.01); *A01B 79/005* (2013.01); *G06Q 10/06395* (2013.01);
(Continued)

(58) Field of Classification Search
CPC .. G06F 17/30241; G06Q 50/02; A01B 79/005
See application file for complete search history.

(56) References Cited

U.S. PATENT DOCUMENTS 5,902,343 A 5/1999 Hale et al.
5,995,894 A * 11/1999 Wendte ................ A01D 41/127
701/1
(Continued)

FOREIGN PATENT DOCUMENTS

EP 1956361 A2 8/2008
GB 2372105 A 8/2002
(Continued)

*Primary Examiner* — Elias Desta
(74) *Attorney, Agent, or Firm* — The Webb Law Firm

(57) ABSTRACT

An agricultural work management system includes: a data input unit configured to receive, from an agricultural crop harvester, harvesting position data indicating a harvesting work position as agricultural land information, harvest amount data indicating a harvest amount of the agricultural crop harvested in the agricultural land, and quality data indicating the quality thereof as agricultural crop information; a database server configured to store the agricultural land information and the agricultural crop information such that they can be associated with each other; an agricultural work evaluation unit configured to perform agricultural work evaluation on the agricultural land based on the agricultural land information and the agricultural crop information; and a data output unit configured to send out the agricultural work evaluation data generated by the agricultural work evaluation unit.

4 Claims, 12 Drawing Sheets

(51) Int. Cl.
*G06Q 50/02* (2012.01)
*H04W 4/04* (2009.01)
*A01D 41/127* (2006.01)

(52) U.S. Cl.
CPC ............ *G06Q 50/02* (2013.01); *H04W 4/046* (2013.01); *A01D 41/1277* (2013.01)

(56) References Cited

U.S. PATENT DOCUMENTS

| | | | |
|---|---|---|---|
| 6,119,442 A | 9/2000 | Hale | |
| 6,442,916 B1* | 9/2002 | Pope | A01D 41/1271 56/10.2 R |
| 6,745,128 B2* | 6/2004 | Hanson | A01B 79/005 702/2 |
| 6,983,217 B2 | 1/2006 | Moore | |
| 7,047,133 B1 | 5/2006 | Dyer et al. | |
| 2005/0066738 A1 | 3/2005 | Moore | |
| 2006/0282467 A1* | 12/2006 | Peterson | G06Q 50/02 |
| 2008/0186487 A1 | 8/2008 | Kormann et al. | |
| 2011/0016144 A1* | 1/2011 | Strachan | A01B 79/005 707/769 |

FOREIGN PATENT DOCUMENTS

| | | |
|---|---|---|
| JP | 9243557 A | 9/1997 |
| JP | 1132550 A | 2/1999 |
| JP | 1153674 A | 2/1999 |
| JP | 2000127657 A | 5/2000 |
| JP | 2002149744 A | 5/2002 |
| JP | 2002189772 A | 5/2002 |
| JP | 2002186348 A | 7/2002 |
| JP | 2002262649 A | 9/2002 |
| JP | 200424056 A | 1/2004 |
| JP | 2004213239 A | 7/2004 |
| JP | 2005278539 A | 10/2005 |
| JP | 2005315768 A | 11/2005 |
| JP | 2006246845 A | 9/2006 |
| JP | 2007295932 A | 11/2007 |
| JP | 201177980 A | 4/2011 |
| WO | 9821928 A1 | 5/1998 |

* cited by examiner

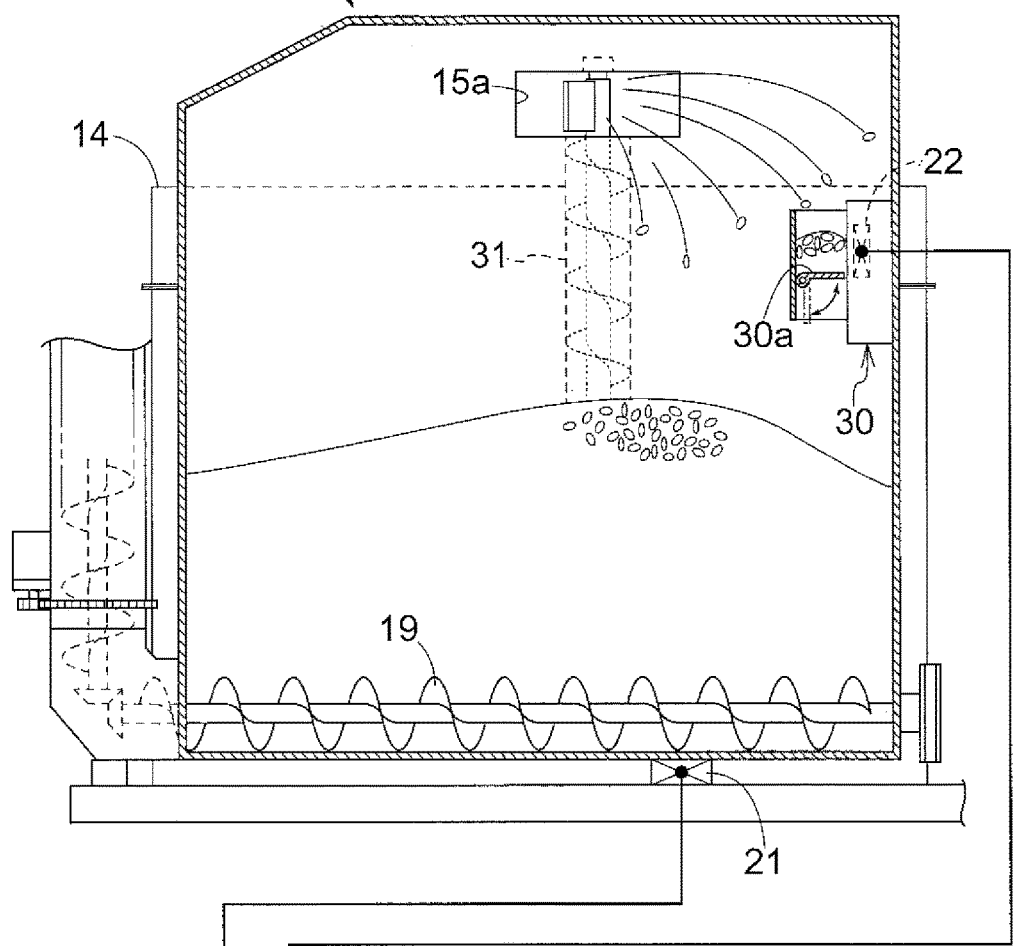
Fig.11
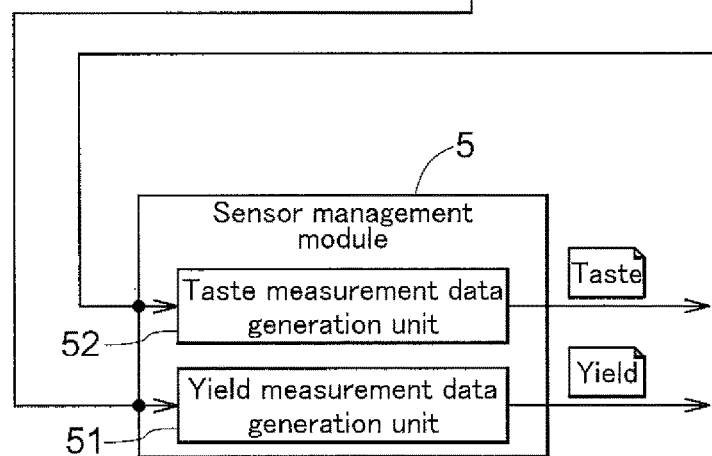

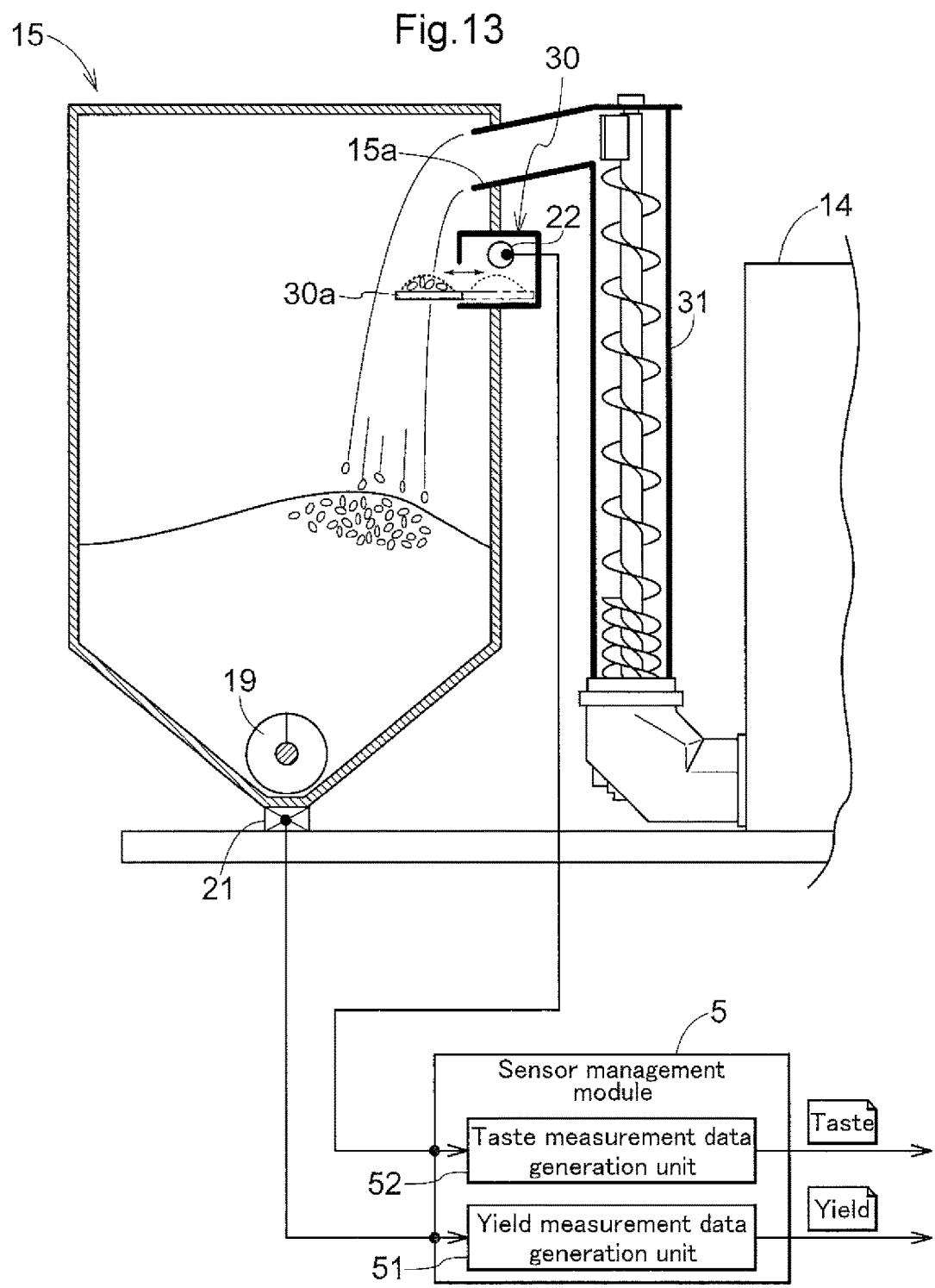

AGRICULTURAL WORK MANAGEMENT SYSTEM AND AGRICULTURAL CROP HARVESTER

CROSS-REFERENCE TO RELATED APPLICATIONS

This application is the United States national phase of International Application No. PCT/JP0213/074251 filed Sep. 9, 2013, and claims priority to Japanese Patent Application Nos. 2012-213253 and 2013-064837 filed Sep. 26, 2012 and Mar. 26, 2013, respectively, the disclosures of which are hereby incorporated in their entirety by reference.

TECHNICAL FIELD OF THE INVENTION

The present invention relates to an agricultural work management system that manages agricultural land information relating to an agricultural land in which harvesting work is performed using an agricultural crop harvester, and agricultural crop information relating to an agricultural crop obtained with the harvesting work. Furthermore, the present invention relates to an agricultural crop harvester incorporated in such an agricultural work management system, and in particular, relates to a grain harvester that includes a threshing apparatus that carries out threshing processing on grain stalks cut from a field, and a grain tank that stores grain sent from the threshing apparatus.

BACKGROUND OF THE INVENTION

From Patent Document 1, for example, there is known to be an agricultural work management technique in which a computer system is used to manage information regarding production history and production management from production of agricultural produce to handing the produce to a consumer. With the management system according to Patent Document 1, a growth diagnostic device executes growth diagnostics in predetermined production unit plots, and the measurement diagnostic result and position information at each measurement location are stored in a memory card. The stored content is later transmitted to an agricultural work management computer system. Also, in harvesting work performed using a harvester in work unit plots therefor, the yield of the work unit plot is measured using a measurement apparatus attached to the harvester, the yield of the work unit plot in which harvesting was performed, and position information obtained using a GPS (Global Positioning System) module are stored in the memory card, and the stored content therein is transmitted to the agricultural work management computer system. Measurement is performed by, for example, emitting near-infrared beams to a growing crop in each work unit plot in a growth unit plot and analyzing the reflected light. In the case of measuring rice, for example, the measurement content is the leaf color, height, number of stems, number of ears, and the like. With this agricultural work management technique, since the position and yield are recorded at the time of harvesting work, it is possible to know the relationship between the position in the field and the yield. However, it is not possible to know the relationship between the position in the field and quality data relating to the taste of the crop, which is information that is important for the crop.

Also, from Patent Document 2, there is known to be an agricultural work device management apparatus that divides a field into plots and stores the work performed by agricultural work vehicles in units of plots. With this management apparatus, a work management terminal device that can communicate with a controller for a work vehicle includes a DVD (Digital Versatile Disc) reading apparatus that stores map data, a GPS module, and a gyrosensor, and obtains the outline of the work location from the map data. The obtained map data of the work location is divided into plots, and local information (existence of hindrances such as utility poles) is stored therein. For example, if the agricultural work vehicle is a combine, the total discharge amount of unhulled rice obtained by harvesting work is input as the yield of the entire field. Also, if the agricultural work vehicle is a tractor, tilling depth sensor detection values obtained during tilling work are automatically stored as tilling depth values for each field plot. It should be noted that in this management apparatus as well, the yield of the crop is dealt with, but quality data relating to the taste of the crop is not dealt with.

Furthermore, an agricultural work machine has also been proposed according to which information that is obtained relating to the field serving as an agricultural land, such as the temperature, amount of sunlight, amount of rainfall, agricultural crop growth information, and the like, is registered in an information center, the growth state of the agricultural crop is determined based on these pieces of information at the time of harvesting work performed by a combine, and thereby processing conditions of a cutting unit and a threshing unit are optimized (e.g., see Patent Document 3). With the technique disclosed in Patent Document 3, it is a prerequisite that the growth information and the like are acquired individually in advance and registered in the information center.

Also, from Patent Document 4, there is known to be a combine in which a detection apparatus that detects grain quality is mounted and a combine drive state that is to be employed is reported based on the result of detection performed by the detection apparatus. Specifically, the combine is configured to display an optimal threshing value based on the result of detecting the moisture content of the grain, and based on that, an operator can adjust the driving speed of a threshing cylinder and the like. Patent Document 4 does not disclose that moisture content and the like of the grain obtained during harvesting work are used after threshing work as quality data relating to taste.

From Patent Document 5, there is known to be a crop harvester in which the quality of the crop is measured by a crop quality measurement means and the measurement information is outputted by an information output means to an external device. The taste, moisture value, quality of external appearance, or the like of the crop is disclosed as the quality that is measured accompanying harvesting of the crop by the crop harvester. Measurement information relating to quality is gathered in correspondence with each of multiple different locations (fields or agricultural lands) in which harvesting work was performed, and the measurement information is outputted to an external device via wireless communication or a removable storage medium. In furtherance thereto, at the location to which the measurement information is outputted, a taste map is created based on the measurement information, in which map the average value of the taste in the field and a variety code are written for each region designated in advance and for each field identification code, but it is not disclosed that the measurement value of the taste and the like is allocated to the harvesting position in the field or the agricultural land.

PRIOR ART DOCUMENTS

Patent Documents

Patent Document 1: JP 2002-149744 A
Patent Document 2: JP 2004-213239 A

Patent Document 3: JP 2011-77980 A
Patent Document 4: JP H11-32550 A
Patent Document 5: JP H11-53674 A

SUMMARY OF THE INVENTION

Problem(s) to Be Solved by the Invention

In view of the foregoing circumstances, an agricultural work management system is desired according to which, at the time of harvesting an agricultural crop using an agricultural crop harvester, agricultural land information including the position in the agricultural land in which the harvesting work is being performed and agricultural crop information including the quality of the agricultural crop obtained with the harvesting work are generated and stored in a database to be used as needed.

More efficient agricultural administration by means of IT technology is being planned and put into practice. The most important agricultural crops for such IT agricultural administration are rice, wheat, and the like. There is a possibility that with these agricultural crops, there is a relationship between the harvest period, harvest location, and the like and the quality thereof, and thus, grain evaluation at the time of harvest is important. However, in the current state, grain harvested by an agricultural crop harvester is conveyed to a management center or the like, where evaluation of the taste and the like of the grain is first performed, and grain evaluation at the time of harvest has not been realized. For this reason, as an object of the present invention, an agricultural crop harvester that can perform harvesting work while immediately evaluating yield, taste, and the like of harvested grain is also desired.

Solution(s) to the Problem(s)

In order to manage agricultural land information relating to an agricultural land in which harvesting work is performed by an agricultural crop harvester and agricultural crop information relating to the agricultural crop obtained with the harvesting work, an agricultural work management system according to the present invention includes: a data input unit configured to receive, from the agricultural crop harvester, harvesting position data indicating a harvesting work position in the agricultural land as the agricultural land information, and harvest amount data indicating a harvest amount of the agricultural crop harvested in the agricultural land and quality data indicating the quality thereof as the agricultural crop information; a database server configured to store the agricultural land information and the agricultural crop information such that they can be associated with each other; an agricultural work evaluation unit configured to perform agricultural work evaluation of the agricultural land based on the agricultural land information and the agricultural crop information; and a data output unit configured to send out the agricultural work evaluation data generated by the agricultural work evaluation unit.

According to this configuration, the harvesting position data, harvest amount data, and quality data obtained as a result of the agricultural work performed by the agricultural crop harvester can be stored in association with each other in a database. By associating an agricultural land specified based on the harvesting position data with the harvest amount and quality of an agricultural crop harvested in that agricultural land with each other, agricultural work evaluation in units of agricultural lands is possible. The agricultural work evaluation data obtained using the agricultural work evaluation is sent out in response to a data download request. By displaying the agricultural work evaluation data on a user terminal, an agricultural worker, who is a user, can know not only the harvest amount but also the quality of the agricultural crop in the agricultural land of interest.

In order to achieve more efficient agricultural work by feeding back information relating to the harvest amount and quality in units of agricultural lands into the subsequent agricultural work, it is preferable that consideration is also given to the fact that even in the same agricultural land, the harvest amount and quality change due to the fact that sunshine conditions and soil properties differ according to slight changes in the location. For this reason, in one preferred embodiment of the present invention, the agricultural land information is generated in association with small plots obtained by the agricultural land that is to be subjected to work being divided by a predetermined size, and the agricultural crop information is also generated in association with the small plots. For example, if a small plot is set as an area with one side being several meters to several tens of meters long, it is possible to know that a reduction in harvest amount or a reduction in quality has occurred due to a shadow cast by a shed or a large tree, local soil defects, or the like, and it is also possible to spread a special fertilizer, carry out soil improvement, or the like in such areas. Also, experimental agricultural work in a specific area is possible as well.

An agricultural crop harvester such as a combine performs harvesting work while traveling linearly (in a straight or curved line), and therefore the harvesting width thereof is around 1 to 3 meters. Accordingly, agricultural crop information acquired over time is obtained in sequence along the traveling route having such a harvesting width. Accordingly, if an area with one side being several meters to several tens of meters long is used as a unit agricultural land area for agricultural evaluation, it is necessary to perform data conversion according to which the time-based agricultural crop information generated in correspondence with the agricultural crop harvester travel route is allocated to the small plots, and therefore it is convenient to use a configuration in which the agricultural work evaluation unit includes such a function.

If the agricultural crop harvester is applied to a combine for grain, it is convenient to use a configuration in which the harvest amount data is generated based on a threshing processing amount per unit time, and the quality data is generated based on a measurement result of a taste sensor unit equipped in the combine. The combine has a function according to which grain obtained by threshing cut grain stalks is retained in a tank or bagged. Accordingly, in the process of this work, it is possible to easily measure a flow amount, or in other words, a harvest amount of the grain. Also, by arranging a taste sensor unit that emits a light beam on the flowing grain and thereby measures a component amount of moisture or protein so as to measure the quality (taste) of the grain, quality data for the grain can be easily obtained. For example, in the case where multiple driers are set to target moisture amounts in a drying facility, it is possible to know in advance which drier the grain harvested by the combine is to be carried into, and efficient conveyance to the drying facility is possible. Accordingly, it is effective to use the moisture of the harvested grain as the quality data.

The present invention is also directed to an agricultural crop harvester suitable for the above-described agricultural work management system. This kind of agricultural crop harvester needs to send, to the agricultural work management computer system, agricultural land information relating to an agricultural land in which harvesting work is performed, and agricultural crop information relating to an agricultural crop obtained with the harvesting work. For this reason, the agricultural crop harvester according to the present invention includes: a positioning module configured to measure the crop harvester's position; a yield sensor configured to measure a harvest amount of an agricultural crop harvested in the agricultural land; a quality sensor configured to measure quality of the agricultural crop harvested in the agricultural land; an agricultural land information generation unit configured to, based on a measurement result of the positioning module, generate harvesting position data indicating a harvesting work position in the agricultural land as the agricultural land information; an agricultural crop information generation unit configured to generate harvest amount data as the agricultural crop information based on a measurement result of the yield sensor, and generate quality data as the agricultural crop information based on a measurement result of the quality sensor; a transmission information management unit configured to create transmission information by associating the agricultural land information and the agricultural crop information with each other; and a communication module configured to send the transmission information to the agricultural work management computer system.

With this crop harvester, agricultural land information including harvesting position data is generated during harvesting work, and agricultural crop information including harvest amount data of the harvested agricultural crop and quality information of the agricultural crop is also generated. Transmission information obtained by associating the generated agricultural land information and agricultural crop information is sent from the agricultural crop harvester to the agricultural work management computer system. Accordingly, the harvest amount and quality of the agricultural crop at predetermined harvesting positions are accumulated in the agricultural work management computer system, and therefore, by evaluating this information, it is possible to achieve efficient agricultural work.

In the case of an agricultural crop such as rice or wheat, harvesting work is performed repeatedly while traveling. For this reason, it is convenient to calculate the harvest amount per predetermined work travel distance as the agricultural crop information. In particular, as described above, if the agricultural land information is generated in association with the small plots obtained by an agricultural land that is to be subjected to work being divided by a predetermined size, the harvest amount per small plot can be easily calculated based on the harvest amount per work travel distance.

If the agricultural crop is rice and the quality sensor detects the moisture of unhulled rice, it is convenient to transmit the moisture of unhulled rice retained in a built-in grain tank or a dryness level required for the unhulled rice along with a retention amount thereof to an external drying facility via a communication module. After receiving this kind of information, the drying facility can suitably set operation parameters for drying apparatuses before the unhulled rice to be processed is imported. Conversely, it is also convenient to transmit the load status of the crop driers and the moisture content of grain in the driers from the drying facility to the harvester side. By thus performing two-way communication between the harvester and the drying facility and mutually exchanging work data, more efficient work can be performed by both.

The agricultural crop harvester according to the present invention includes: a grain tank configured to store grain sent from a threshing apparatus configured to carry out threshing processing on grain stalks cut from a field; a yield sensor configured to measure yield of the grain; a taste sensor configured to measure taste of the grain; a measurement data management unit configured to, in a time series, manage yield measurement data input from the yield sensor and taste measurement data input from the taste sensor; and a harvest evaluation unit configured to generate harvested grain property information by linking together information on position in the field, the yield measurement data, and the taste measurement data.

According to this configuration, a yield sensor that measures the yield of the grain sent from the threshing apparatus and a taste sensor that measures the taste of the grain are included in the agricultural crop harvester, and it is therefore possible to measure the yield and taste of the grain during harvesting. Moreover, since the yield measurement data and taste measurement data obtained with that measurement are managed in a time series, grain harvest time evaluation is possible not only at a time of harvest but also at a suitable time after harvest. This kind of yield measurement data and taste measurement data are linked with the field serving as the harvesting location as well and are handled as harvested grain property information, and therefore can contribute to IT agricultural administration.

In one preferred embodiment of the present invention, the yield sensor is a load cell included in the grain tank, the taste sensor is an optical non-contact sensor for measuring moisture of grain, and the taste sensor is arranged in the grain tank or is arranged on a grain conveyance path extending from the threshing apparatus to the grain tank. By measuring the weight of the retained grain using a load cell provided in the grain tank, which is the retaining location in the agricultural crop harvester for the grain, it is possible not only to simply measure the yield, but also to measure an increase in the yield per time or per work travel. Also, by using an optical non-contact sensor, it is possible to measure the moisture, which is important for the taste of the grain, without damaging the grain. Also, due to the fact that a non-contact sensor is used, the measurement position also can be freely chosen from the grain conveyance path that extends from the threshing apparatus to the grain tank, including the grain tank.

It is also important to perform precise agricultural administration with consideration given to differences in environmental conditions such as sunlight in the field, differences in soil and fertilizer distribution in the field, and the like by further dividing the field into smaller plots and measuring the yield and moisture of the grain harvested in predetermined regions resulting from the division. In order to support this kind of agricultural administration, in one preferred embodiment of the present invention, a configuration is used in which, as the yield, the yield of the grain harvested in a predetermined region of the field is calculated based on a travel route and a yield per unit travel distance, and as the taste, the moisture of the grain harvested in the predetermined region of the field is calculated based on the travel route and an average taste of the harvested grain per unit travel distance.

Similarly, as a more advanced technique for evaluating the yield and moisture of the grain harvested at the predetermined regions resulting from division, in another embodiment of the present invention, a GPS module is included which is configured to measure a cutting position of the grain stalks in the field, wherein the harvested grain property information includes the cutting position, and the yield and moisture of the grain harvested in a predetermined region of the field are calculated based on the harvested grain property information. By using the GPS module for the position measurement, the cutting position can be accurately obtained without relying on the travel route of the agricultural crop harvester.

If the harvested grain property information is transmitted to the management center or the like using communication at the same time as it is generated, there is no need to store the harvested grain property information in the agricultural crop harvester. However, giving consideration also to preparing for the occurrence of communication errors or performing sequential checking on the agricultural crop harvester side, it is also preferable to include a storage unit configured to store the harvested grain property information.

Common agricultural crop harvesters do not include communication modules (line communication units) that can perform data communication with a computer system in a remotely-located management center via a communication line. In such a case, it is convenient to use a mobile communication terminal held by a driver of the agricultural crop harvester as the communication module (line communication unit). In this case, data communication between the agricultural crop harvester and the mobile communication terminal can be performed between a data input/output unit provided on a vehicle-mounted LAN (Local Area Network) of the agricultural crop harvester and a data input/output unit provided in the mobile communication terminal. Wired communication such as a USB (Universal Serial Bus) connection, or wireless communication such as Wi-Fi can be used for this kind of data communication. In order to achieve this object, in a preferred embodiment of the present invention, a configuration is used in which a data input/output unit capable of data communication with a mobile communication terminal is included, the measurement data management unit and the harvest evaluation unit are constructed in the mobile communication terminal, and the harvested grain property information is sent to a management center via a communication module (line communication unit) of the mobile communication terminal.

BRIEF DESCRIPTION OF THE DRAWINGS

FIG. 11 is a schematic diagram showing an arrangement of a yield sensor and a taste sensor.

FIG. 13 is a schematic diagram showing another embodiment of a taste measurement mechanism.

EMBODIMENTS OF THE INVENTION

Figure 1:
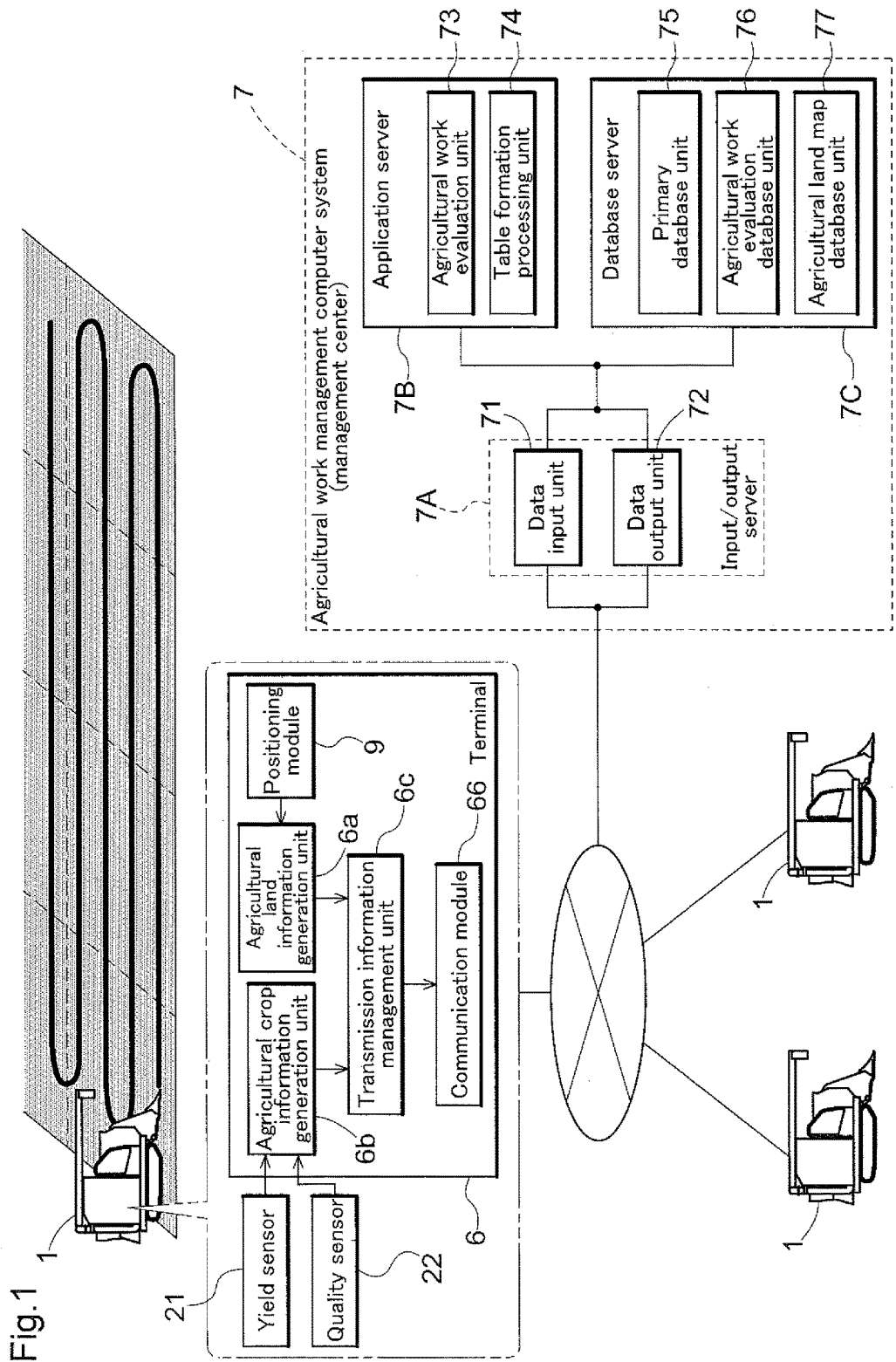
FIG. 1 is a schematic diagram showing a basic configuration of an agricultural work management system according to the present invention.
Figure 2:
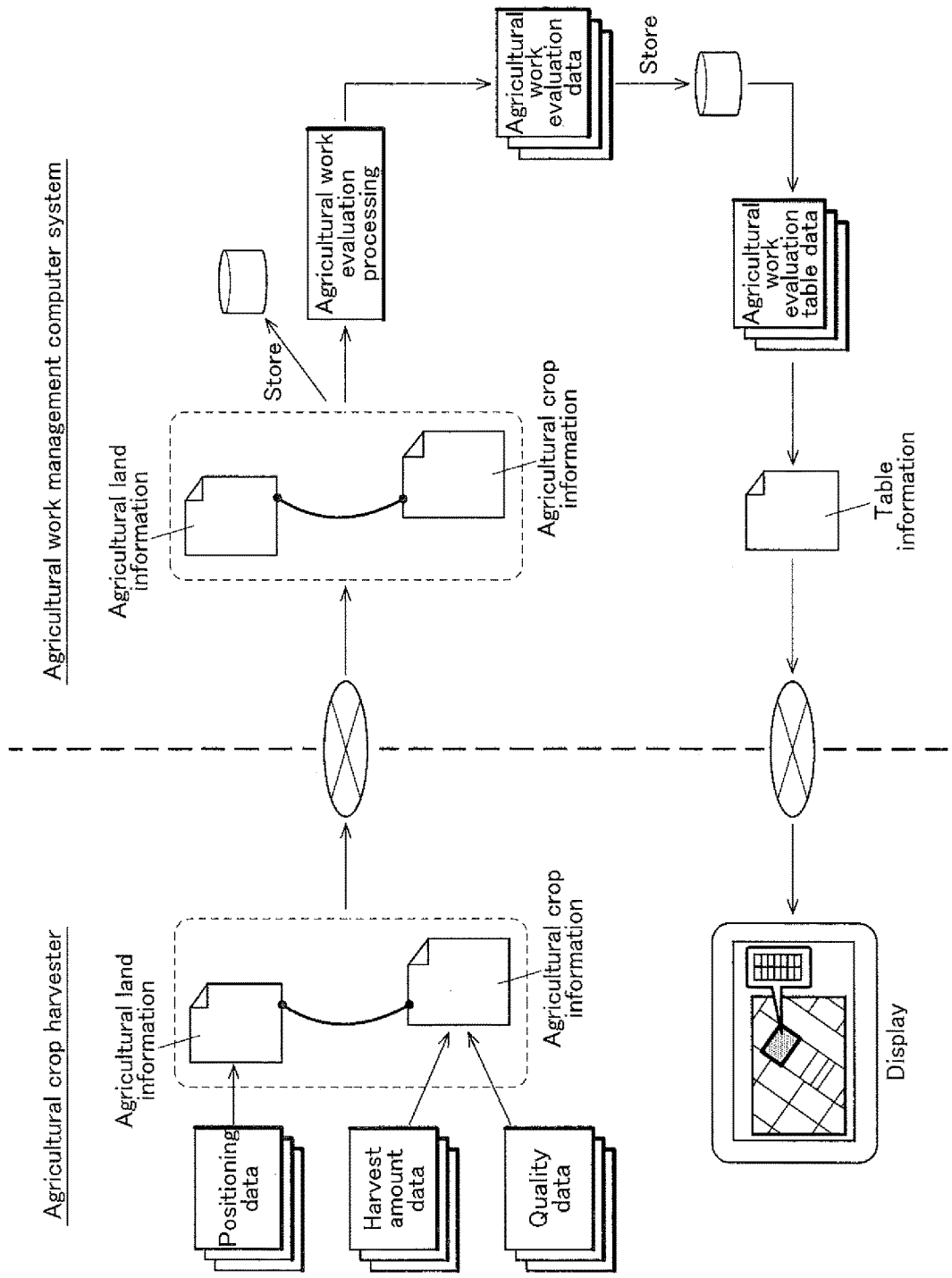
FIG. 2 is a schematic diagram showing a flow of information in the agricultural work management system.

Before specific embodiments of the present invention are described, basic structures of the agricultural work management system of the present invention will be described. FIG. 1 shows a basic configuration of an agricultural work management system. FIG. 2 shows a flow of information in the agricultural work management system.

With agricultural work in this context, harvesting work for an entire work target agricultural land is performed by repeating linear travel and 180-degree pivoting travel of an agricultural crop harvester (hereinafter abbreviated simply as "harvester") 1. The agricultural crop harvester 1 is equipped with a terminal computer 6 according to which data can be communicated between the terminal computer 6 and a management computer system of an agricultural work management center. The terminal computer (hereinafter referred to as "terminal" or "data processing module") 6 may be fixed to the harvester 1 in a mode such as an ECU (Electric Control Unit) connected to a vehicle-mounted LAN, and it may be connected to the harvester 1 via a cradle or the like as a mobile device such as a tablet computer or a smartphone.

The harvester 1 includes a yield sensor 21 that measures the harvest amount of an agricultural crop harvested in the agricultural land that is to be subjected to work, and a quality sensor 22 that measures the quality of the harvested agricultural crop. The result of measurement performed by the yield sensor 21 and the result of measurement performed by the quality sensor 22 are sent to the terminal 6. Examples of the quality sensor 22 include a taste sensor that measures moisture and protein included in the agricultural crop, and the like.

The terminal 6 includes a positioning module 9 that measures the current position, or in other words, the position of the terminal 6. It is possible to use a positioning module 9 known as a GPS module that is built into a tablet computer or a smartphone. In the case of using a terminal 6 that does not include the positioning module 9, the positioning module 9 needs to be equipped in the harvester 1. However, the positioning module 9 is substantially the same as that used in a car navigation system, and it is therefore possible to use that positioning module 9.

In any case, the terminal 6 includes an agricultural land information generation unit 6a, an agricultural crop information generation unit 6b, a transmission information management unit 6c, and a communication module 66. Based on the result of measurement performed by the positioning module 9, the agricultural land information generation unit 6a generates harvesting position data that indicates a harvesting work position. The harvesting position data is incorporated in the agricultural land information along with an agricultural land name or an agricultural land ID that specifies the work target agricultural land. Of course, it is possible to specify the agricultural land using only the harvesting position data, and therefore the agricultural land name or agricultural land ID is not mandatory. The agricultural crop information generation unit 6b generates harvest amount data from the result of measurement performed by the yield sensor 21 and generates quality data from the result of measurement performed by the quality sensor 22. The harvest amount data and quality data are handled as the agricultural crop information. The transmission information management unit 6c creates transmission information by associating the generated agricultural land information and agricultural crop information with the harvesting position. The communication module 34 sends the transmission information to an agricultural work management computer system 7 of the management center.

The agricultural work management computer system 7 includes an input/output server 7A, an application server 7B, and a database server 7C. The input/output server 7A includes a data input unit 71 that sends the agricultural land information and agricultural crop information included in the transmission information received from the terminal 6 to the application server 7B and the database server 7C. The application server 7B includes an agricultural work evaluation unit 73 that performs agricultural work evaluation on the agricultural land based on the agricultural land information and the agricultural crop information, and a table formation processing unit 74 according to which the result of the agricultural work evaluation is made into a table. The database server 7C includes a primary database unit 75, an agricultural work evaluation database unit 76, and an agricultural land map database unit 77. The primary database unit 75 functions as a storage unit for source data, which can be written in or read out from while maintaining the mutual association between the agricultural land information and the agricultural crop information sent from the harvester 1. The agricultural work evaluation database unit 76 functions as a storage unit for agricultural work evaluations for each agricultural land, performed by the agricultural work evaluation unit 73, and table data obtained by the agricultural work evaluation being made into a table. The agricultural land map database unit 77 is basically the same as a normal map database, but it is a map database in which attribute data unique to the agricultural land, such as soil properties, water drainage properties, and the like, can be included.

Figure 3:
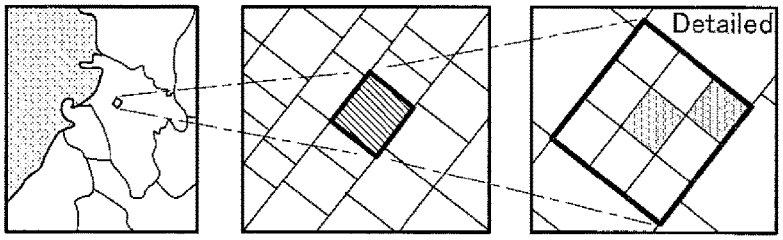
FIG. 3 is a diagram of a screen shown on a display, in which agricultural work evaluation data is displayed as a table.

In response to a request, a data output unit 72 included in the input/output server 7A transmits the agricultural work evaluation data generated by the agricultural work evaluation unit 73, or table data obtained by the agricultural work evaluation data being made into a graphic or a table, to the terminal 6 or another terminal registered in the agricultural work management system. FIG. 3 shows an example of a screen displayed on a display of the terminal 6 based on this kind of table data. In this diagram example, an agricultural land information display field 8A, in which items relating to the agricultural land information are displayed, is arranged in the upper portion of the screen, and an agricultural crop information display field 8B, in which items relating to the agricultural crop information are displayed, is arranged in the lower portion of the screen.

The agricultural land information display field 8A includes agricultural land ID 81 according to which the agricultural land is specified, agricultural land name (town name, commonly-used name, etc.) 82, agricultural land area 83, and agricultural land map 84. The agricultural lands in the agricultural land map 84 can be identified (distinguished by color or pattern) by comparing them to a reference value indicating the average harvest amount or quality such as the average taste value. The agricultural crop information display field 8B includes agricultural crop type (e.g. Koshihikari rice) 85, harvest amount (for the entire agricultural land or per unit area) 86, and agricultural crop quality value 87. Here, rice production is handled, and therefore an average protein amount 87a and an average moisture amount 87b of the dehulled rice are displayed as the agricultural crop quality value 87.

By viewing this kind of table based on the agricultural work evaluation data on a screen or by printing it out, the status of the agricultural land can be understood at a glance.

Next, a basic configuration for processing of data relating to grain harvested by a grain harvester, which is an example of the agricultural crop harvester 1 according to the present invention, will be described with reference to FIGS. 4 and 5.

Figure 4:
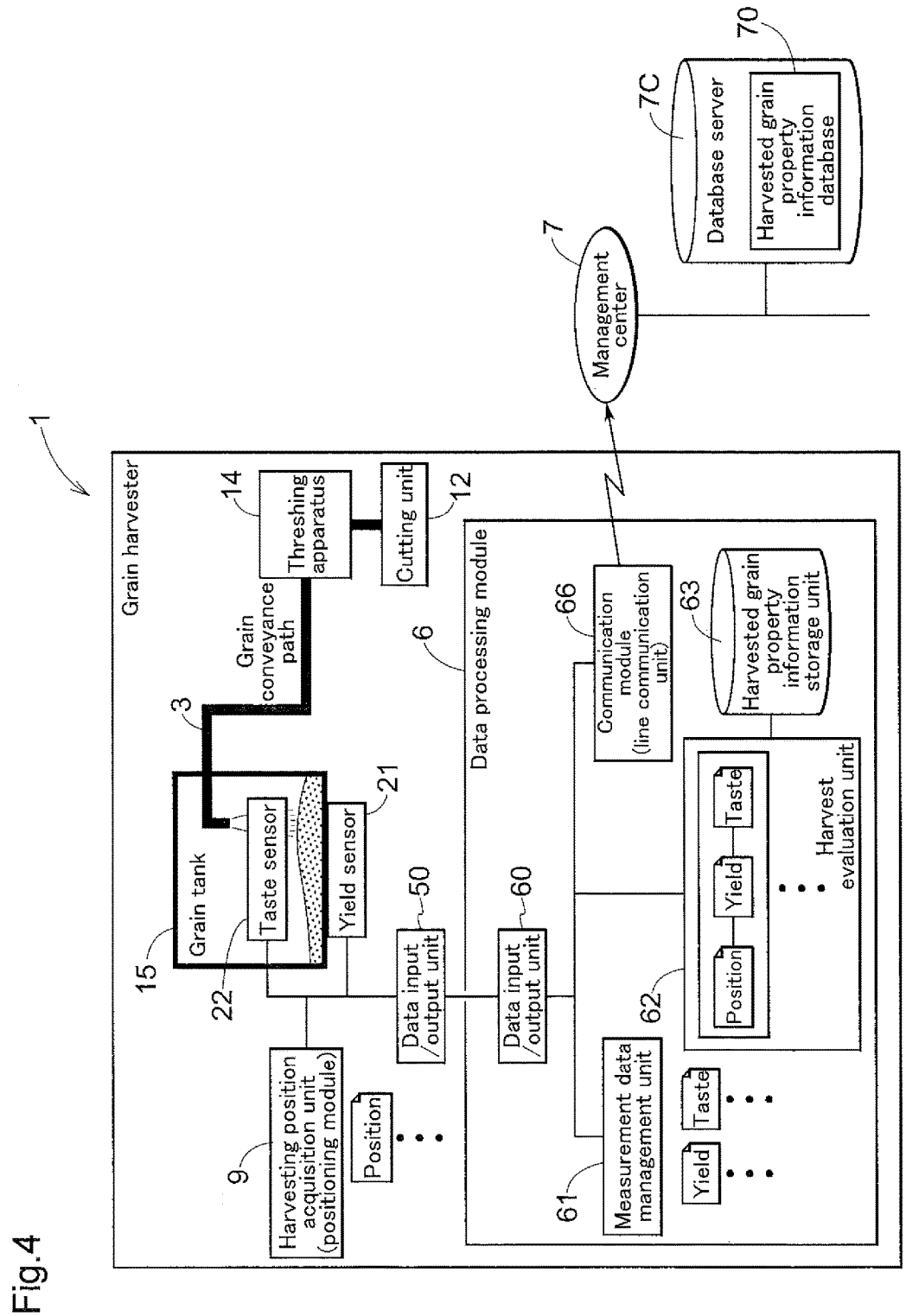
FIG. 4 is a schematic diagram for illustrating a basic configuration for data processing relating to grain harvested by a grain harvester according to the present invention.

As shown in FIG. 4, the grain harvester 1 is equipped with a threshing apparatus 14 that carries out threshing processing on grain stalks cut from a field by a cutting unit 12 while traveling, and a grain tank 15 that stores grain sent from the threshing apparatus 14 via a grain conveyance path 3. A yield sensor 21 that measures the yield of the harvested grain, and a quality sensor 22 that measures the taste of the grain are furthermore included. The yield sensor 21 can be constituted by a load cell included in the grain tank 15. Due to being provided so as to support the grain tank 15, the load cell can measure the weight (yield) of the grain retained in the grain tank 15. In this case, based on the yield successively measured by the load cell since the start of harvesting work, it is possible to obtain the yield per unit travel distance, which can be converted into the yield per unit time, or in other words, the yield per unit area. The quality sensor 22 is an optical non-contact sensor that measures the moisture and protein of the grain using spectroscopy, which is arranged in the grain tank 15 or arranged on the grain conveyance path 3. The measurement performed by the quality sensor 22 is performed in batches or continuously with a sampling method. A configuration may be used in which the average of multiple measurement results is calculated.

Note that with the grain harvester 1, the terminal 6, which was described with reference to FIG. 1, is a data processing module 6 that is configured as one electronic control unit (ECU) of the grain harvester 1. A measurement data management unit 61 and a harvest evaluation unit 62 are configured as the functional units of the data processing module 6 by a program. The measurement data management unit 61 can manage, in a time series, yield measurement data input from the yield sensor 21 and taste measurement data input from the quality sensor 22. The harvest evaluation unit 62 generates harvested grain property information by linking data relating to the field serving as the harvesting location, the yield measurement data, and the taste measurement data together. Also, a harvested grain property information storage unit 63 that stores the generated harvested grain property information at least temporarily is also prepared.

The data relating to the field includes the field name, the field position on the map, and the like, and if the field is subdivided into predetermined plots, the plot number is further included. A harvesting position acquisition unit 23 is included in order to manually or mechanically acquire data relating to position from such data relating to the field.

The yield measurement data and taste measurement data managed by the measurement data management unit 61 or the harvested grain property information generated by the harvest evaluation unit 62 can be sent via a communication line from a communication module 66 serving as a line communication unit to a remotely-located management center 7. In the management center 7, the received yield measurement data and taste measurement data, or the harvested grain property information is made into a database format and stored in the harvested grain property information database 70 included in the database server 7C of the management center (or more accurately, the agricultural work management computer system installed at the management center) 7, and the data can thereby be used for agricultural administration management.

A common grain harvester 1 does not include a communication module (line communication unit) 66 that can perform data communication with the management center 7 via a communication line. In this case, a configuration can be used in which the data processing module 6 is realized by a mobile communication terminal such as a personal computer, a tablet, or a smartphone, and the data input/output unit 60 of the mobile communication terminal and the data input/output unit 50 of the electronic control unit of the grain harvester 1 are connected such that data can be transferred therebetween. Wired communication such as a USB connection, and wireless communication such as Wi-Fi are suitable for the connection between the data input/output unit 60 and the data input/output 50.

Note that if the data processing module 6 is realized by a mobile communication terminal with a GPS module, the harvesting position acquisition unit 23 can also be included in the data processing module 6. This kind of harvesting position acquisition unit 23 can acquire position data obtained by the GPS module of the mobile communication terminal as the harvesting position. The GPS module can output data on the position in the field with a rather high degree of accuracy. Accordingly, since the cutting position of the grain stalk, which serves as this kind of accurate harvesting position, can be included in the harvested grain property information, it is possible to calculate the yield and moisture of the grain harvested at a predetermined region of the field based on the harvested grain property information and use it for agricultural administration management.

It is convenient to use the GPS module to obtain the position information relating to the cutting position or the harvesting position, but if it is assumed that the cutting travel route of the grain harvester 1 in the field has already been determined, the cutting position can be calculated based on the travel route and the travel time or travel distance. As an example of this, a method of calculating the yield and taste (in this context, moisture) of grain harvested in predetermined regions of the field based on the travel route and the yield and average moisture per unit travel distance will be described with reference to FIG. 5. In FIG. 2, it is assumed that the grain harvester 1 performs harvesting work in a zig-zag travel route obtained by repeating linear travel and 180° pivoting in the field.

First, the field is divided into multiple small plots: A1, A2, A3, . . . . Accompanying the harvesting travel of the harvester 1, yield data and moisture data are input for each predetermined time: t1, t2, t3, . . . or for each predetermined distance: D1, D2, D3, . . . , and therefore yields: V1, V2, V3, . . . and moisture: Q1, Q2, Q3, . . . are acquired at that time interval.

Here, letting t1, t6, and t7 be time points at which the traveling of the grain harvester 1 belongs to the small plot: A1, the yield: V[A1] of the small plot: A1 is obtained using $$V[A1]=V1+V6+V7$$

and the average moisture: Q[A1] of the small plot: A1 is obtained using $$Q[A1]=(Q1+Q6+Q7)/3$$

Furthermore, letting t2, t5, and t8 be time points belonging to the small plot: A2, the yield: V[A2] of the small plot: A2 is obtained using $$V[A2]=V2+V5+V8$$

and the average moisture: Q[A2] of the small plot: A2 is obtained using $$Q[A2]=(Q2+Q5+Q8)/3$$

Thus, it is possible to allocate the yield and moisture to each small plot.

Figure 5:
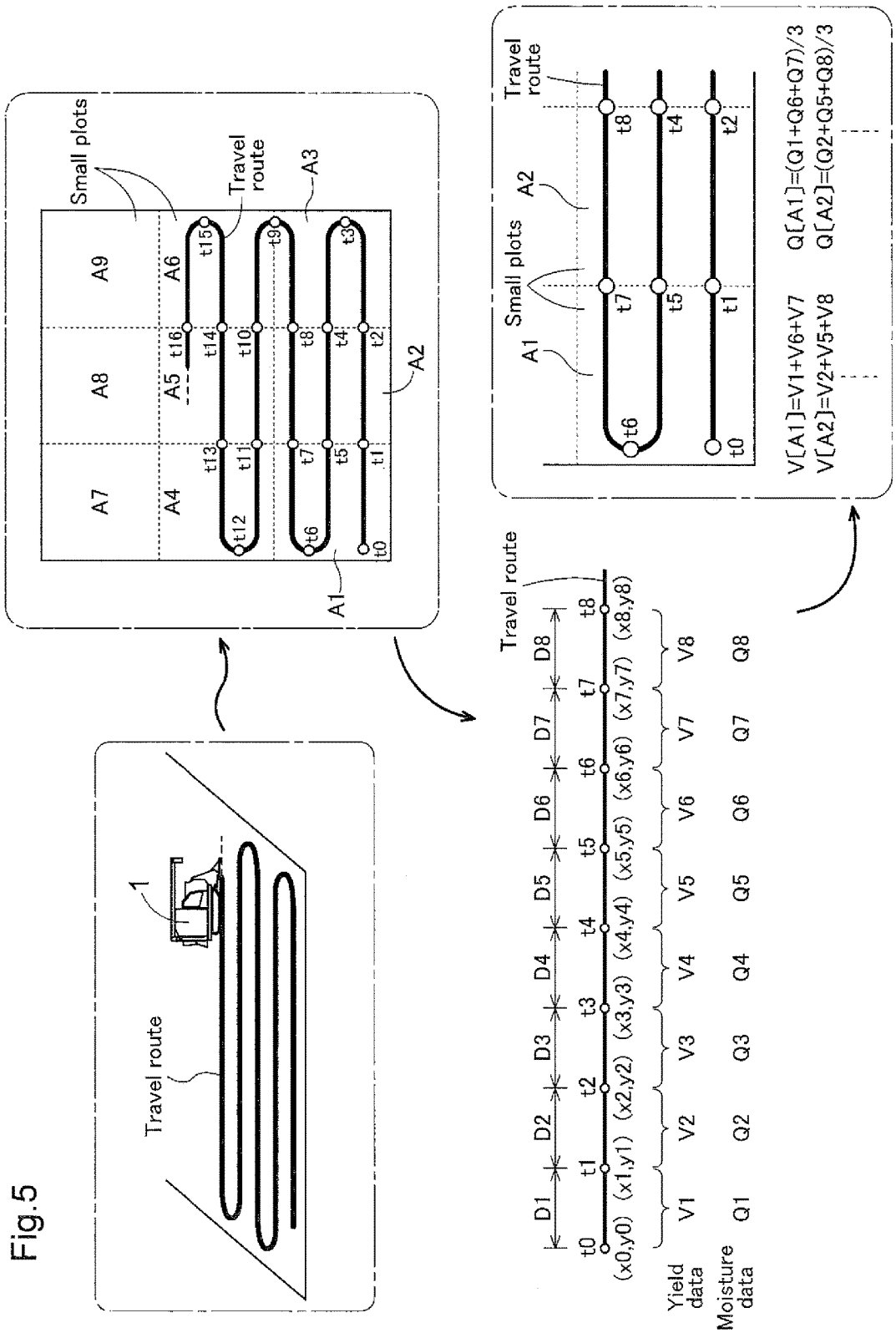
FIG. 5 is a schematic diagram for illustrating an example of processing for allocating yield and taste to field regions.

With the example shown in FIG. 5, upon dividing a field surrounded by embankments or the like into multiple small plots, evaluation of the yield and quality for each harvesting position (field) is performed by the harvest evaluation unit 62. Accordingly, the harvested grain property information thereof makes it possible to evaluate the yield and moisture of the field on a micro scale. However, it is also possible to perform evaluation using fields of an entire region such as a town or village as the processing target field. The harvested grain property information in such a case makes it possible to evaluate the yield and moisture in fields of an entire region on a macro scale.

First Embodiment

Figure 6:
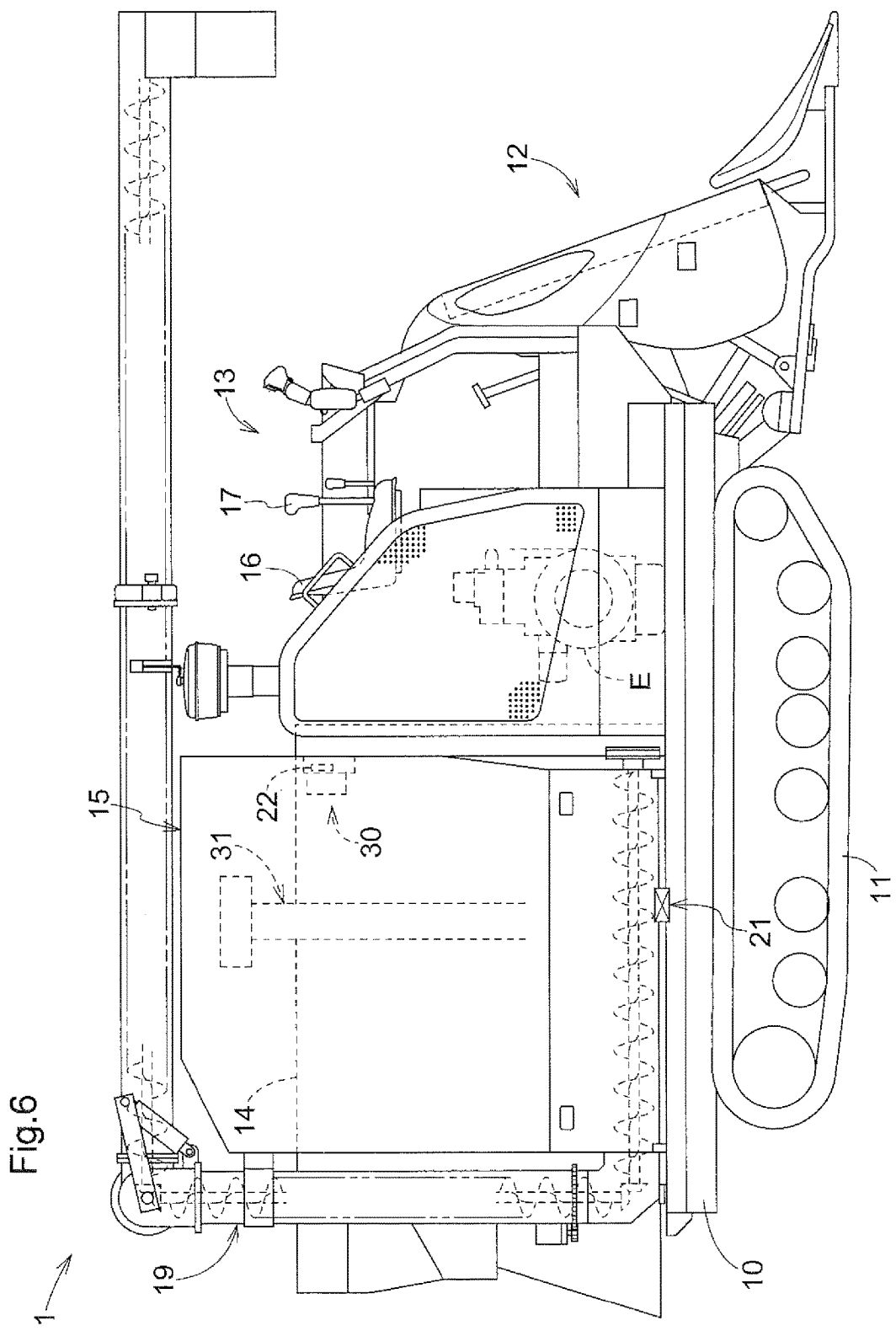
FIG. 6 is a side view of a combine to which the present invention has been applied.
Figure 7:
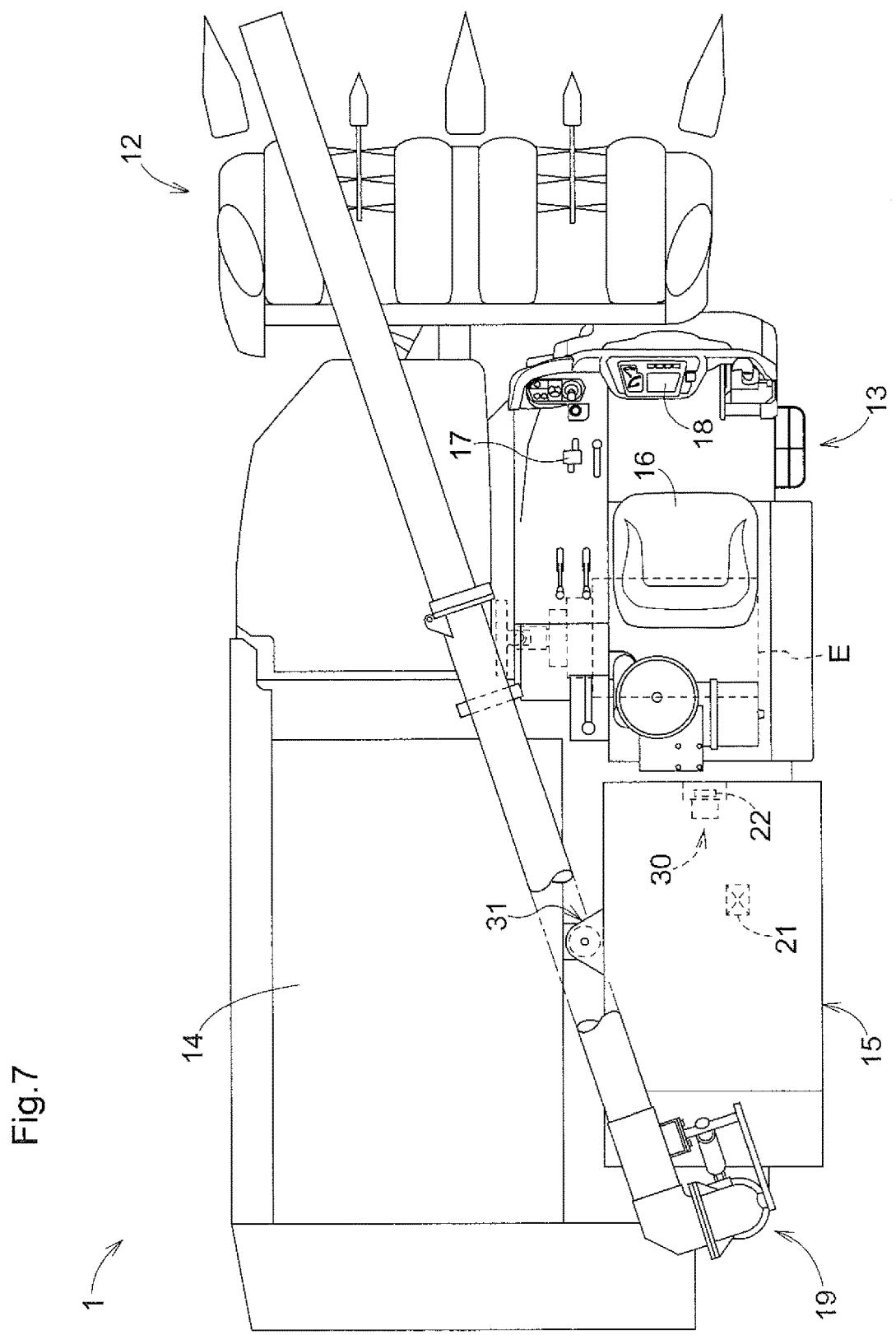
FIG. 7 is a plan view of the combine shown in FIG. 6.

Next, one specific embodiment of a grain harvester that is applied to a first embodiment of the present invention will be described with reference to the drawings. Here, the grain harvester is a crawler-type auto-threshing combine (hereinafter to be referred to as simply "combine") 1. FIG. 6 shows a side view of the combine 1, and FIG. 7 shows a plan view of the combine 1.

The combine 1 includes a device body frame 10 obtained by connecting multiple steel members, such as a rectangular pipe member. A pair of left and right crawler travel apparatuses (hereinafter to be abbreviated as simply "crawlers") 11 are equipped below the device body frame 10. Toward the front of the right half of the body frame 10, an engine E is mounted, and a driving portion 13 is formed above that. A driver's seat 16, a maneuvering lever 17, and the like are arranged in the driving portion 13. On the front end toward the left of the body frame 10, a cutting portion 12 is provided which cuts harvest target crop grain stalks located in front of the body during work traveling and conveys them rearward. On the left half of the device body frame 10, a threshing apparatus 14 is mounted which receives cut grain stalks conveyed by the cutting unit 12, conveys them rearward while carrying out threshing processing on the parts of the cut grain stalks where the grain is attached, and carries out selection processing on the grain obtained by the threshing processing. Toward the rear of the right half of the device body frame 10, a grain tank 15 made of sheet metal is mounted which retains grain conveyed upward from the threshing apparatus 14 via a screw-lift supply conveyor 31. The grain tank 15 is equipped with a grain discharging apparatus 19 that discharges grain retained in the grain tank 15 to the exterior. A yield sensor 21 that detects the weight of the grain is equipped below the grain tank 15, and a taste measurement mechanism 30 in which a taste sensor (quality sensor) 22 is incorporated as a taste analyzer is equipped inside of the grain tank 15, although this is only shown schematically in FIGS. 3 and 4. Measurement data for the moisture value and protein value of the grain is outputted from the taste sensor 22 as the quality data.

Figure 8:
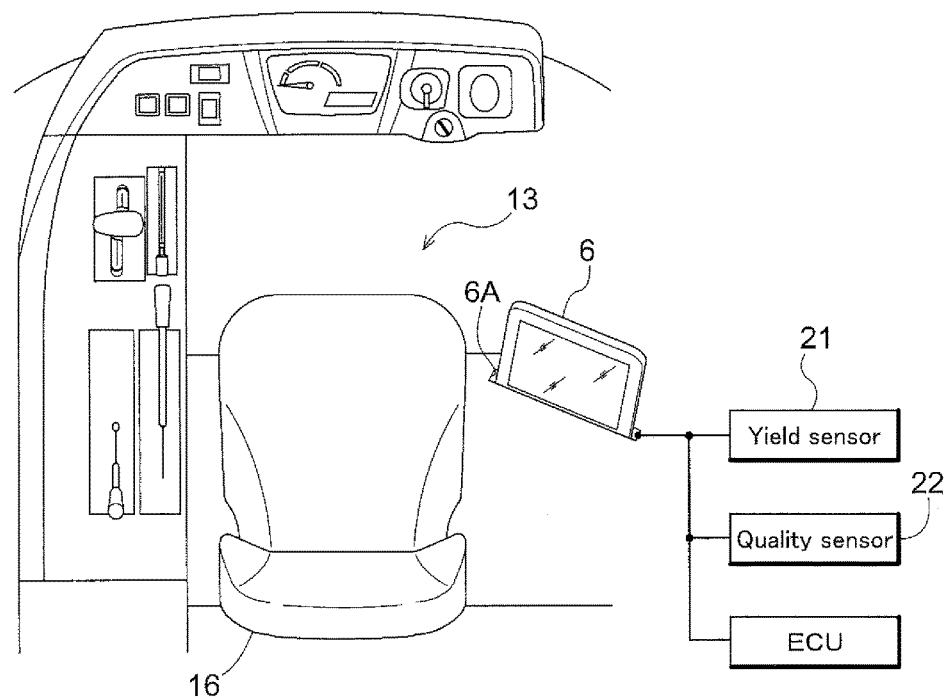
FIG. 8 is a schematic diagram showing an overall internal space of a driving portion of the combine shown in FIG. 6.

FIG. 8 is a schematic diagram schematically showing the internal space of the driving portion 13. The driver's seat 16, various maneuvering levers, an operation switch, a meter display panel, and the like are arranged in the driving portion 13. In the present embodiment, the terminal 6 is constituted by a portable tablet-type computer. Accordingly, the terminal 6 is used while mounted on a terminal mounting portion 6A provided near the driver's seat 16. The mounting portion 6A functions as a power-supplying connection portion and a data exchange connection portion for the terminal 6. Note that a smartphone can be used instead of the tablet-type computer.

A GPS module that functions as a positioning module 9, and a communication module 66 that can connect to the Internet via a mobile phone line are mounted in the terminal 6. Also, applications that function as the agricultural land information generation unit 6a, the agricultural crop information generation unit 6b, and the transmission information management unit 6c are installed. Accordingly, the harvest amount data from the yield sensor 21, and the moisture value data and protein value data from the taste analyzer are sent to the terminal 6 via the mounting portion 6A. Furthermore, internal data is also sent from various ECUs of the combine 1 to the terminal via the mounting portion 6A.

Upon being introduced to a predetermined agricultural land that is to be subjected to harvesting work, the combine 1 repeatedly performs cutting processing and threshing processing while traveling over the agricultural land. At this time, with the positioning module 9 of the terminal 6, positioning data (latitude, longitude) that indicates the current position of the combine 1 is generated, and positioning information composed of the actual time and the positioning data is sent to the terminal 6. At the same time, the harvest amount data, and quality data (moisture value and protein value of grain) are also sent.

In the agricultural land information generation unit 6a of the terminal 6, the received positioning data is converted into harvesting position data indicating the harvesting work position, and is treated as agricultural land information. At this time, the positioning data composed of a longitude value and latitude is converted into a coordinate system in which a predetermined position set in the agricultural land is used as the origin, and the harvesting position data can be converted into position data composed of an x coordinate value and a y coordinate value. The agricultural crop information generation unit 6b of the terminal 6 handles the received harvest amount data and quality data as the agricultural crop information. The transmission information management unit 6c associates the agricultural land information and the agricultural crop information with each other such that the relationship between a specific area in the agricultural land and the harvest amount or quality can later be evaluated. At this time, temporal shifting between the measurement time for the harvesting work position and the quality measurement of the grain harvested at that position is corrected with consideration given to the time for the cutting processing and the time for the threshing processing. Associated pieces of agricultural land information and agricultural crop information are sent to the agricultural work management center as transmission information. However, the association of the agricultural land information and the agricultural crop information may be performed on the agricultural work management center side.

In general, since the combine 1 performs harvesting work using zig-zag traveling in which linear travel and 180° pivoting are repeated on the agricultural land, harvesting of the agricultural crop is performed along a substantially linear travel route. In contrast to this, the distribution of the soil quality of the agricultural land, and the consequent distribution of the agricultural crop quality are spread out over a surface. For this reason, it is convenient to calculate agricultural crop information (harvest amount and quality) for each small plot obtained by dividing the agricultural land that is to be subjected to work by a predetermined size, and attribute the agricultural crop information to each small plot.

It is preferable that the processing for allocating the harvest amount: D and the quality: Q to the small plots of the agricultural land employs a method such as that described with reference to FIG. 5. Accordingly, agricultural crop information (harvest amount and quality) can be allocated to each small plot.

After the agricultural land surrounded by embankments or the like is divided into multiple small plots, agricultural work evaluation can be performed by the agricultural work evaluation unit 73. That is to say, the agricultural work evaluation data enables evaluation of the harvest amount and quality in such an agricultural land on a micro scale. However, it is possible to perform agricultural work evaluation treating the agricultural lands of an entire region such as a town or village as a processing target agricultural land and treating an agricultural land surrounded by embankments or the like as a small plot. The agricultural work evaluation data in this case makes it possible to perform evaluation of the harvest amount and quality in the agricultural lands of an entire region on a macro scale.

For example, if a database server 7C such as that shown in FIG. 1 is constructed in the management center 7, the agricultural land information and the agricultural crop information sent from the combine 1 are stored in a primary database unit 75 in a state in which the association therebetween is maintained, and the agricultural work evaluation data generated by the agricultural work evaluation unit 73 is stored in the agricultural work evaluation database unit 76. Accordingly, in response to a request from a user, information relating to the harvest amount and quality of a specific region or agricultural land is provided to the user. At this time, a table formation processing unit 74 can use the map data stored in the agricultural land map database unit 77 to generate graphical information obtained by making the harvest amounts and quality into a table on a macro or micro scale, using the map as a base. In this embodiment, the input/output server 7A is constructed as a Web server. The Web server uses a communication protocol known as HTTP (Hyper Text Transfer Protocol) to exchange data with a Web browser installed in the terminal 6. In order to exchange data with each other, a document written in HTML (Hyper Text Markup Language), XML (Extensible Markup Language), or the like is used, and the document can include an image, audio, and a program for further performing some kind of processing.

Figure 9:
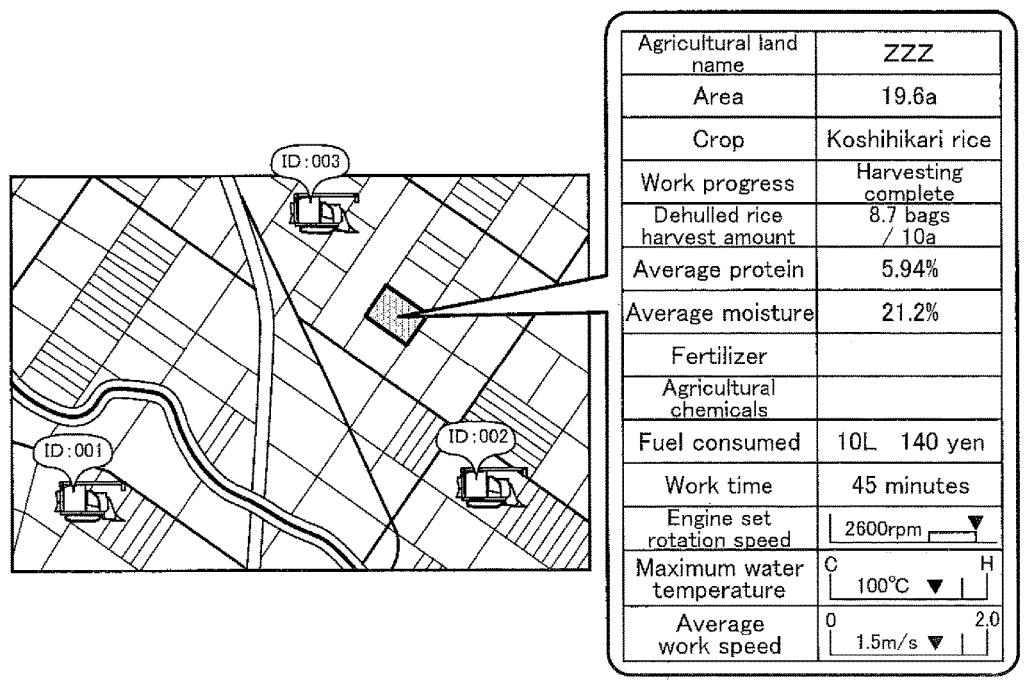
FIG. 9 is a diagram of a screen displayed on a display, in which agricultural work evaluation data is displayed as a table in a large region about the size of a town or village.

A graphical image can be easily handled with an HTML file or an XML file. FIG. 9 shows an example of an agricultural work evaluation screen displayed by the Web browser of the terminal 6. The top screen of the agricultural work evaluation screen is a map of a region including many agricultural lands bordered by embankments. The agricultural lands are distinguished by color, and the details thereof can be changed by selection. With a first selection, color is used to divide the agricultural lands into agricultural lands in which harvesting work is complete and agricultural lands in which harvesting work is not complete. With a second selection, color is used to divide the agricultural lands into agricultural lands in which a target harvest amount has been reached or exceeded, and agricultural lands in which a target harvest amount has not been reached. Furthermore, regarding quality, it is also possible to use color to distinguish between agricultural lands in which a target protein value has been reached and agricultural lands in which it has not been reached, for example.

Due to a specific agricultural land ZZZ being clicked on, the top screen shown in FIG. 9 shows a sub-window that displays agricultural land information, agricultural crop information, and optional agricultural work device information, for the agricultural land ZZZ. Here, the agricultural land information includes the agricultural land name, area, crop, work progress, fertilizer (type and amount), and agricultural chemicals (type and amount), and the agricultural crop information includes a dehulled rice harvest amount, average protein, and average moisture. Note that the agricultural work device information includes consumed fuel, work time, engine set rotation speed, maximum water temperature, and average work speed. The agricultural work device information is transferred from the ECU of the combine 1 to the terminal 6, is furthermore transferred to the agricultural work management computer system, and is stored in the database server 7C. The top screen shown in FIG. 9 also displays an icon indicating the current position of the combine 1 registered in the agricultural work management center.

Figure 10:
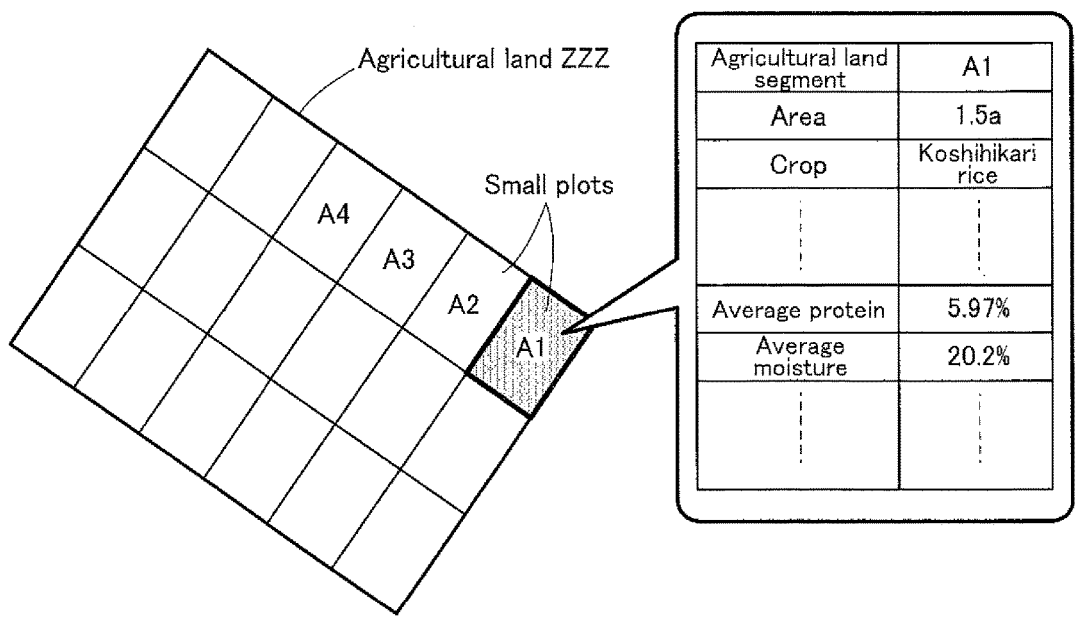
FIG. 10 is a diagram of a screen displayed on a display, in which agricultural work evaluation data is displayed as tables in units of small plots in an agricultural land surrounded by embankments.

FIG. 10 shows a specific agricultural land ZZZ selected out of many agricultural lands shown in the top screen in FIG. 9, and the agricultural land ZZZ is constituted by many small plots obtained by dividing the agricultural land ZZZ by a predetermined size. That is to say, the entire region shown in the top screen in FIG. 7 corresponds to a specific agricultural land ZZZ selected in FIG. 8, and the many agricultural lands in the top screen in FIG. 9 correspond to the small plots shown in FIG. 10. Accordingly, by clicking on a specific small plot A1 on the screen shown in FIG. 10, the agricultural land information and agricultural crop information relating to that small plot A1 are displayed. Based on this information, precise agricultural work management is possible.

In the above-described embodiment, the harvest amount and quality of the agricultural crop is sampled in units of work travel positions, but the present invention is not necessarily limited to this. For example, it may be performed using one agricultural land surrounded by embankments as a unit. Furthermore, since the harvester 1 includes a harvested crop tank in which the harvested crop is temporarily retained (e.g., in the case of using a combine, a grain tank is included as the harvested crop tank), the harvest amount and quality of the agricultural crop may be sampled using the capacity of the harvested crop tank as one unit.

Also, in one preferred embodiment for performing sampling using a capacity that is smaller than the capacity of the grain tank 15 as a unit, a portion for temporarily retaining the harvested crop is included in the grain tank 15. That is to say, an opening/closing lid mechanism is provided on the bottom of a temporary retention portion, and a sensor that detects when the temporary retention portion is full and an electrostatic capacitance proximity sensor are provided, and each time the temporary retention portion becomes full, the opening/closing lid is opened, and the harvest amount is discharged to the grain tank 15. At the time of this discharge, quality measurement is performed by the taste sensor 22, as a result of which quality data can be obtained. By measuring the time for the temporary retention portion to become full and the average vehicle speed during that time, the travel distance until when the temporary retention portion becomes full can be obtained. The travel distance can be used as an index for the harvest amount (harvest amount index). Alternatively, it is also possible to obtain the harvest amount per travel distance, or in other words, the harvest amount per unit area of the agricultural land. By making an index relating to one or both of the thus-obtained harvest amount and quality visible on the map, a map of the harvest amount per unit small plot of the agricultural land can be created.

In the case of using a smartphone or a tablet computer as the terminal 6, these devices usually include a near field communication function such as a Wi-Fi function or Bluetooth (brand name), and therefore the terminal 6 can be used as a remote control for a specific operation of the harvester 1. In particular, if the harvester 1 is a combine, it is convenient to be able to control vertical movement, left and right pivoting, and the switching on and off of grain discharge of an unloader equipped in the combine by operating the terminal 6. Furthermore, it is possible to use a two-way data communication function between the ECU of the combine and the terminal 6 to define operations performed by remote control according to the current position of the unloader. For example, it is possible to provide the terminal 6 with an operation button that causes the unloader to jut out counterclockwise toward the rear of the vehicle body when at a storage position, and causes the unloader to be automatically stored when at any other position. This kind of remote control function in the terminal 6 is realized using an application.

Second Embodiment

Next, one specific embodiment of a grain harvester that is applied to the first embodiment of the present invention will be described with reference to the drawings. The grain harvester employed here is also a crawler-type self-hulling combine 1, which is shown in FIGS. 6 and 7.

As shown schematically in FIG. 11, the yield sensor 21 is a load cell attached to the device body frame 10, and the grain tank 15 is mounted on the load cell. That is to say, the yield sensor 21 measures the yield of the harvested grain by measuring the weight of the grain tank 15 and of the grain retained therein. The yield per predetermined time is obtained by measuring the increase amount using the yield sensor 21 at each predetermined sampling time. At this time, if consideration is given to the travel speed, it is also possible to obtain the yield per predetermined distance. As shown schematically in FIG. 7 as well, in the present embodiment, the taste sensor 22 is incorporated in a taste measurement mechanism 30 that is mounted on a side wall of the grain tank 15 from the exterior. Inside of the grain tank, the taste measurement mechanism 30 includes a measurement platform 30a, which swings between a horizontal orientation and a hanging orientation so as to open and close. The measurement platform 30a is covered by a cylindrical case having an upper opening and a lower opening. Also, the measurement platform 30a is provided at a position reached by a portion of the grain conveyed from the threshing apparatus 14 by the supplying conveyor 31 and emitted from the introduction opening 15a to the grain tank 15 by a bladed wheel. This makes it possible for the measurement platform 30a in the horizontal orientation to catch grain that comes flying from the introduction opening 15a. In the stage where a predetermined amount of grain is on the measuring platform 30a, measurement is performed by the taste sensor 22. Here, spectral analysis is used, and measurement of grain moisture and protein value is possible. Also, a taste value obtained based on the moisture, protein, and the ratio of these components can be used as the measurement value. When the measurement performed by the taste sensor 22 is complete, the measurement platform 30a is swung to the hanging orientation, according to which the grain on the measurement platform 30a is released. When the grain is released and a subsequent predetermined sampling time is reached, the measurement platform 30a is swung once again to the horizontal orientation.

Figure 12:
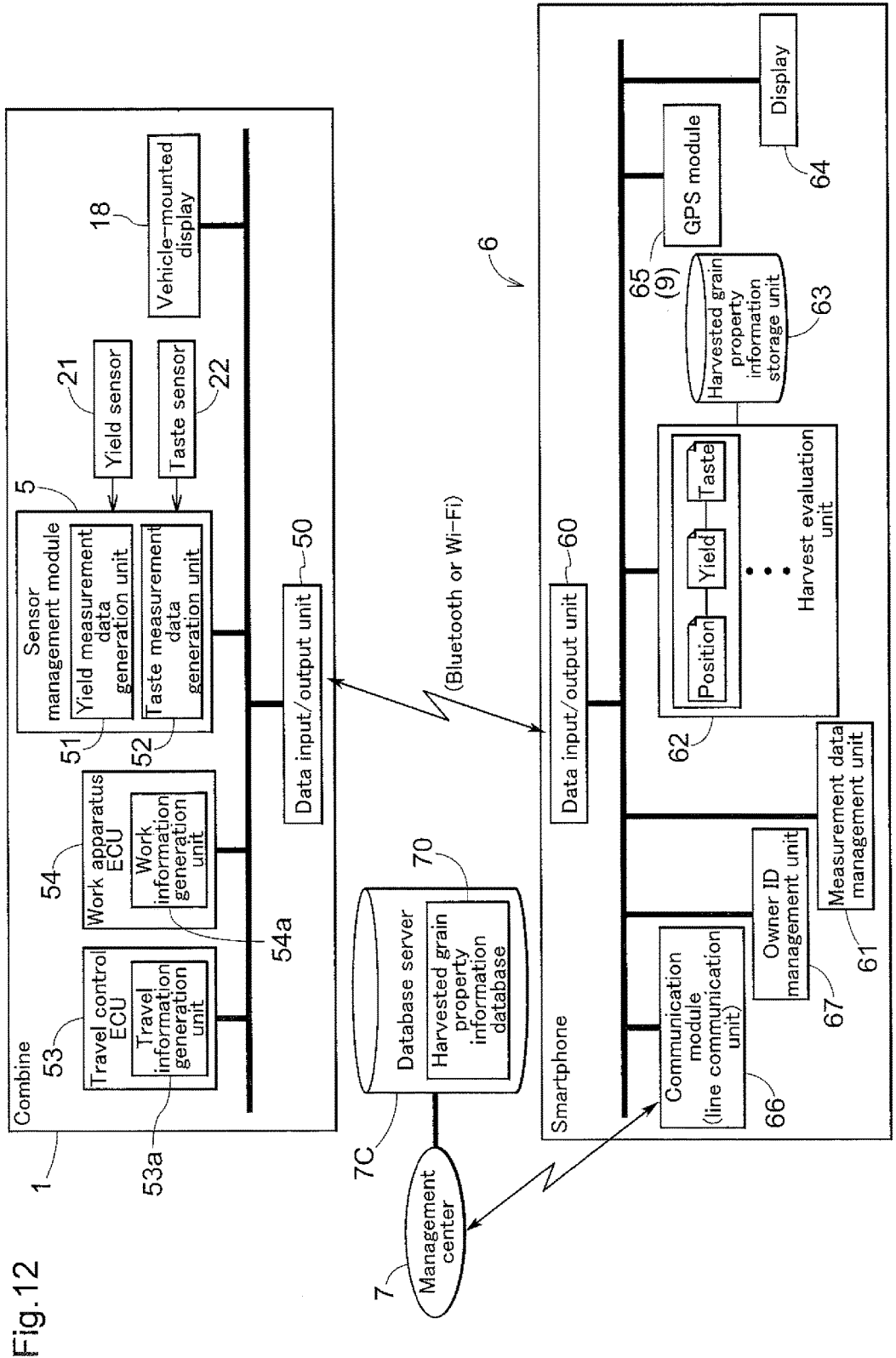
FIG. 12 is a functional block diagram showing functional units in a control system of a combine and a smartphone incorporated in the combine.

A control system of the combine 1 is shown in FIG. 12. This control system is substantially based on the basic principle shown in FIG. 4, but the data processing module 6 is constituted by a smartphone, which is a mobile communication terminal held by a driver. Also, the harvesting position acquisition unit 23 that acquires the harvesting position has been replaced by a GPS module 65 mounted in the smartphone. Accordingly, the control system for the combine 1 side is constituted by standard constituent elements connected by a vehicle-mounted LAN.

That is to say, the functional units relating to the present invention that are constructed in the control system for the combine 1 side are a travel control ECU (electronic control unit) 53, a work apparatus ECU 54, a sensor management module 5, a vehicle-mounted display 18, and a data input/output unit 50. The travel control ECU 53 is an ECU that deals with various types of control information relating to vehicle travel, and for example, includes a travel information generation unit 53a that converts data such as the travel speed, engine rotation speed, travel distance, and fuel efficiency, which are obtained from the sensor management module 5 via the vehicle-mounted LAN, into travel information. The work apparatus ECU 54 is an ECU that controls cutting and harvesting apparatuses such as the cutting unit 12 and the threshing apparatus 14, and includes a work information generation unit 54a that converts data indicating the operation state or driving state of the cutting and harvesting apparatuses into ground work information based on sensor information obtained from the sensor management module 5.

The sensor management module 5 has a function of receiving input of measurement signals from various sensors such as the travel speed sensor and a travel distance sensor, in addition to the above-described taste sensor 22 (taste measurement mechanism 30) and yield sensor 21, and transferring them to other functional units. In particular, the sensor management module 5 includes a yield measurement data generation unit 51 that generates yield measurement data based on the measurement signal from the yield sensor 21, and a taste measurement data generation unit 52 that generates taste measurement data based on the measurement signal from the taste sensor 22 (taste measurement mechanism 30).

The data input/output unit 50 is a wireless communication unit that performs communication at a relatively short range for data exchange with the smartphone held by the driver, and it operates using a protocol such as Wi-Fi or Bluetooth (registered trademark).

The measurement data management unit 61 and the harvest evaluation unit 62, which were described using the basic principle shown in FIG. 1, are constructed here as smartphone applications. Also, a harvested grain property information storage unit 63 that stores harvested grain property information generated by the harvest evaluation unit 62 is constructed in an external memory of the smartphone. For this reason, the measurement data management unit 61 receives the yield measurement data and the taste measurement data from the yield measurement data generation unit 51 and the taste measurement data generation unit 52 via the data input/output unit 60 of the smartphone, which is capable of performing data exchange with the data input/output unit 50. The smartphone conventionally includes an owner ID management unit 67 and a communication module 66 that functions as a line communication unit. By using the function of the owner ID management unit 67 to perform authentication of the driver, the security of information generated by the combine 1 can be ensured. Also, using the communication module 66, the harvested grain property information can be transmitted to the management center 7, and can be stored in the harvested grain property information database 70.

In the above-described second embodiment, a sensor that measures the yield, taste, and the like of the harvested grain is provided in the combine, and since harvested grain property information resulting from linking yield measurement data and taste measurement data to the field serving as the harvesting location can be generated while harvesting work is being performed, evaluation is possible at the time of harvesting the grain.

Furthermore, modified examples of the above-described embodiments will be given below.

(1) The measurement platform 30a of the taste measurement mechanism 30 in which the taste sensor 22 is incorporated can also have a structure other than one that swings between a horizontal orientation and a hanging orientation. For example, as shown schematically in FIG. 13, a structure may be used in which the measurement platform 30a is moved in and out of a box-shaped case for the taste measurement mechanism 30. In this case, the taste measurement mechanism 30 is arranged such that the measurement platform 30a, when in an extended state, can receive grain that is conveyed from the threshing apparatus 14 by the supply conveyor 31 and is emitted from the introduction opening 15a of the grain tank 15. With this structure, in a stage in which a predetermined amount of grain is on the measurement platform 30a, the measurement platform 30a is brought inside of the taste measurement mechanism 30, and measurement is performed by the taste sensor 22.

Also, the location at which the taste measurement mechanism 30 is arranged is not limited to the grain tank 15, and it is also possible to arrange it at a suitable location on the grain conveyance path 3 from the threshing apparatus 14 to the grain tank 15. Furthermore, in the case of using a taste measure mechanism 30 that is capable of high-speed measurement processing, it is also possible to use grain being conveyed (flying grain emitted from the introduction opening 15a, in particular) as the measurement target.

(2) In order to perform more accurate measurement, the yield sensor 21 may use a configuration in which load cells are respectively arranged in four corner regions of the bottom surface of the grain tank 15, instead of being constituted by a single load cell arranged near the center of the bottom surface of the grain tank 15.

(3) The harvested grain property information generated by the harvest evaluation unit 62 may be stored in the harvested grain property information storage unit 63 and the generated harvested grain property information may be transmitted to the management center 7 directly in real time. Also, the generated harvested grain property information may be transmitted to the management center 7 without being stored in the harvested grain property information storage unit 63.

(4) In the above-described embodiments, the data processing module 6 was constructed in the control system built into the grain harvester 1 or in the mobile communication terminal held by the driver, but the data processing module 6 may be constructed in a computer system with a communication function that is installed at a location away from the field.

(5) In the above-described embodiments, a grain harvester (combine) was used as an agricultural crop harvester, but the present invention may of course be applied to a grain harvester other than that. Also, a grain harvester in this context is used in a broad sense, and includes not only rice and barley, but also corn and other crops.

INDUSTRIAL APPLICABILITY

The present invention can be applied not only to harvesting grain such as rice, barley, and corn, but also to the fields of harvesting vegetables such as potatoes, carrots, and daikon, and harvesting fruit such as apples and mandarin oranges. Furthermore, the present invention can be applied not only to a crawler-type auto-hulling combine, but also to a regular combine and to a wheel-type combine.

DESCRIPTION OF REFERENCE SIGNS

1: Combine (agricultural crop harvester, grain harvester)
14: Threshing apparatus
15: Grain tank
21: Yield sensor (load cell)
22: Quality sensor (taste sensor, taste analyzer)
23: Harvesting position acquisition unit
3: Computer terminal (tablet computer, smartphone)
30: Positioning module
6: Data processing module
6a: Agricultural land information generation unit
6b: Agricultural crop information generation unit
6c: Transmission information management unit
61: Measurement data management unit
62: Harvest evaluation unit
63: Harvested grain property information storage unit
65: GPS module
66: Communication module (line communication unit)
9: Positioning module
7: Management center
7A: Input/output server (Web server)
71: Data input unit
72: Data output unit
7B: Application server
73: Agricultural work evaluation unit
74: Table formation processing unit
7C: Database server
70: Harvested grain property information database
75: Primary database unit
76: Agricultural work evaluation database unit
77: Agricultural land map database unit

What is claimed is:

1. An agricultural work management system configured to manage agricultural land information relating to an agricultural land in which harvesting work is performed by an agricultural crop harvester, and agricultural crop information relating to an agricultural crop obtained with the harvesting work, the agricultural work management system comprising:
the agricultural crop harvester configured to obtain, during the harvesting work, harvesting position data indicating a harvesting work position in the agricultural land as the agricultural land information, harvest amount data indicating a harvest amount of the agricultural crop harvested in the agricultural land, and quality data indicating the quality of the agricultural crop harvested in the agricultural land as the agricultural crop information;
an agricultural land information generation unit configured to generate the agricultural land information in association with small plots obtained by the agricultural land that is to be subject to work being divided by a predetermined size, and convert a value of the harvesting position data into a value of a coordinate system in which a predetermined position set in the agricultural land is used as the origin;
an agricultural crop information generation unit configured to generate the agricultural crop information in association with the small plots;
a data input unit configured to receive, from the agricultural crop harvester, the harvesting position data indicating the harvesting work position in the agricultural land as the agricultural land information, the harvest amount data indicating a harvest amount of the agricultural crop harvested in the agricultural land, and the quality data indicating the quality thereof as the agricultural crop information, wherein the agricultural land information generation unit converts the harvesting position data;
a database server configured to store the agricultural land information and the agricultural crop information such that they can be associated with each other;
an agricultural work evaluation unit configured to perform agricultural work evaluation of the agricultural land based on the agricultural land information and the agricultural crop information, wherein the agricultural work evaluation unit generates a map of the harvest amount indicating a harvest amount of the agricultural crop harvested for each of the small plots; and
a data output unit configured to output the map generated by the agricultural work evaluation unit.

2. The agricultural work management system according to claim 1, wherein the agricultural work evaluation unit performs data conversion according to which time-based agricultural crop information generated in correspondence with a travel route of the agricultural crop harvester is allocated to the small plots.

3. The agricultural work management system according to claim 1, wherein the agricultural crop harvester is a combine for grain, the harvest amount data is generated based on a threshing processing amount per unit time, and the quality data is generated based on a measurement result of a taste sensor unit equipped in the combine.

4. The agricultural work management system according to claim 3, wherein the quality data includes moisture of harvested grain.

* * * * *